United States Patent
Jon et al.

(10) Patent No.: US 8,814,559 B2
(45) Date of Patent: Aug. 26, 2014

(54) CLAMPING APPARATUS FOR INJECTION MOLDING MACHINE

(71) Applicant: Woojin Plaimm Co., Ltd, Incheon (KR)

(72) Inventors: Yun Son Jon, Incheon (KR); Kyeong Ha Park, Incheon (KR); Young Shin Kim, Seoul (KR); Seung Ho Cho, Seoul (KR)

(73) Assignee: Woojin Plaimm Co., Ltd, Seo-gu, Incheon (KR)

( * ) Notice: Subject to any disclaimer, the term of this patent is extended or adjusted under 35 U.S.C. 154(b) by 0 days.

(21) Appl. No.: 13/940,047

(22) Filed: Jul. 11, 2013

(65) Prior Publication Data

US 2014/0113023 A1    Apr. 24, 2014

(30) Foreign Application Priority Data

Oct. 23, 2012  (KR) .......................... 10-2012-0117916

(51) Int. Cl.
  *B29C 45/66*  (2006.01)
  *B29C 33/22*  (2006.01)
  *B29C 45/68*  (2006.01)

(52) U.S. Cl.
  CPC .............. *B29C 33/22* (2013.01); *B29C 45/661* (2013.01); *B29C 45/681* (2013.01)
  USPC ....................................................... 425/593

(58) Field of Classification Search
  USPC .............................................. 425/593, 451.6
  See application file for complete search history.

(56) References Cited

U.S. PATENT DOCUMENTS

| | | | | |
|---|---|---|---|---|
| 4,276,013 A * | 6/1981 | Bazzea | ......................... | 425/593 |
| 4,773,845 A * | 9/1988 | Nagura et al. | ................ | 425/593 |
| 5,102,327 A * | 4/1992 | Reinhart | ....................... | 425/593 |
| 5,297,953 A * | 3/1994 | Wang | ............................. | 425/593 |
| 5,370,524 A * | 12/1994 | Liang et al. | .................... | 425/593 |
| 5,843,496 A | 12/1998 | Ito et al. | ......................... | 425/589 |
| 6,345,975 B1 * | 2/2002 | Wang | ............................. | 425/593 |
| 7,182,590 B2 * | 2/2007 | Nishimura et al. | ........... | 425/593 |
| 8,585,395 B2 * | 11/2013 | Senga et al. | .................. | 425/593 |
| 2002/0068109 A1 | 6/2002 | Wang | ............................. | 425/592 |
| 2011/0020485 A1 * | 1/2011 | Taniguchi | .................. | 425/451.7 |

FOREIGN PATENT DOCUMENTS

| | | | | |
|---|---|---|---|---|
| DE | 29600634 | 1/1996 | ............. | B29C 45/66 |
| EP | 0679494 | 4/1995 | ............. | B29C 45/68 |
| JP | 55-148855 | 10/1980 | ............. | B55D 17/26 |
| JP | 3072741 | 8/2000 | ............. | B29C 45/66 |
| JP | 2005-178350 | 7/2005 | ............. | B29C 45/66 |
| JP | 2005-238570 A | 9/2005 | ............. | B29C 45/56 |

(Continued)

OTHER PUBLICATIONS

Japan Patent Office, Office Action, Japanese Filing No. 2013-146997, dated Sep. 17, 201, 3 pages.

(Continued)

*Primary Examiner* — James Mackey
(74) *Attorney, Agent, or Firm* — Sunstein Kann Murphy & Timbers LLP

(57) ABSTRACT

Disclosed herein is a five-joint clamping apparatus for an injection molding machine. The clamping apparatus according to the present invention keeps advantages of a conventional five-joint clamping apparatus, specifically, high mold opening or closing speed and control precision, has an increased stroke distance in link mechanism, and has a structure capable of pressing a central portion of a mold.

2 Claims, 9 Drawing Sheets

(56) References Cited

FOREIGN PATENT DOCUMENTS

| | | | | |
|---|---|---|---|---|
| JP | 2007-307795 A | 11/2007 | .............. | B29C 33/20 |
| JP | 2009-251804 | 10/2009 | ........... | G05B 19/416 |
| JP | 2011-020368 A | 2/2011 | .............. | B29C 33/22 |
| JP | 2012-236362 | 12/2012 | .............. | B29C 45/66 |
| KR | 10-2011-0004377 A | 1/2011 | .............. | B29C 45/66 |

OTHER PUBLICATIONS

European Patent Office, European Search Report, Application No. 13174648.9-1705, dated Dec. 2, 2013, 3 pages.

European Patent Office, European Office Action, Application No. 13174648.9-1706, dated Dec. 16, 2013, 5 pages.

* cited by examiner

CLAMPING APPARATUS FOR INJECTION MOLDING MACHINE

BACKGROUND OF THE INVENTION

1. Field of the Invention

The present invention relates generally to clamping apparatuses for injection molding machines and, more particularly, to a five-joint clamping apparatus for an injection molding machine which retains the advantages of a conventional five-joint clamping apparatus, specifically, high mold opening or closing speed and control precision, has an increased stroke distance in link mechanism, and has a structure capable of pressing a central portion of a mold.

2. Description of the Related Art

Injection molding machines are apparatuses for forming products of synthetic resin material or the like. Generally, injection molding machines form products in such a way as to melt chips or powder and put it into a mold having a predetermined shape. There are various kinds of injection molding machines, from small sized machines to large sized machines. Polyester, vinyl acetate, different kinds of plastics, nylon, etc. can be used as material for forming products using the injection molding machines.

Such injection molding machines are classified into hydraulic injection molding machines and electric injection molding machines. In conventional techniques, hydraulic injection molding machines have been widely used.

Among hydraulic injection molding machines, a direct pressure type injection molding machine, in particular, has an advantage of a simple structure, being configured such that a mold is opened or closed by a cylinder.

However, the hydraulic injection molding machine requires consumption of a large amount of working fluid, inducing disadvantages of causing environment pollution and being difficult to maintain and repair.

As the above disadvantages of the hydraulic injection molding machine are magnified, electric injection molding machines, which are configured such that operation thereof including mold closing or opening operation is enabled by a servo-motor, are being more widely used.

Among the electric injection molding machines, toggle type injection molding machines are mainly used.

The electric injection molding machines require, in terms of maintenance, only the lubrication of toggle links, are able to reduce energy consumption by up to 80%, and markedly reduce the possibility of environment pollution because working oil is not used.

The injection molding machines are apparatuses which conduct injection molding operation after mold closing force has been applied to a mold between a movable plate and a stationary plate using tie bars.

As stated above, toggle type injection molding machines are mainly used as the electric injection molding machines and are operated in such a way that, while a mold is interposed between a movable plate and a stationary plate, as links are stretched, pushing force applied to the mold is increased, thus generating the mold closing force and increasing it.

For this, the injection molding machines include a clamping apparatus. Clamping apparatuses of the toggle type injection molding machines are classified into a single toggle type clamping apparatus including a pair of toggle links, and a double toggle type clamping apparatus including two pairs of toggle links.

The single toggle type clamping apparatus is suitable for a small injection molding machine. The double toggle type clamping apparatus is suitable for an injection molding machine that requires comparatively mold closing force.

Double toggle type clamping apparatuses are classified into a four-joint type and a five-joint type according to a structure of connecting a toggle link to a crosshead link.

The four-joint clamping apparatus is configured such that a crosshead link, a long link and a short link are connected together by a single joint.

The four-joint clamping apparatus is advantageous in that comparatively large mold closing force can be generated using relatively small input force, because mechanical advantage is large.

However, in the four-joint clamping apparatus, a displacement of the crosshead is comparatively large during a mold opening or closing stroke. Therefore, a mold opening speed is low, and the size of the clamping apparatus is increased.

To overcome the problems of the four-joint clamping apparatus, the five-joint clamping apparatus was proposed.

The five-joint clamping apparatus is configured such that a joint of connecting a crosshead link to a short link is provided separately from a joint of connecting a long link to the short link.

In the five-joint clamping apparatus, the crosshead link 112 is connected to the short link 108 at a joint E1 which forms a smaller radius of rotation based on a joint B1 than does a joint A1. Compared to the four-joint clamping apparatus in which the crosshead link 112 is connected to the joint A1, the speed of a mold opening or closing stroke is increased, and the length of the clamping apparatus can be reduced because of reduced displacement of the crosshead 111.

Furthermore, the conventional five-joint clamping apparatus has an inward-folding and inner-joint type toggle link structure in which a toggle link is folded inwards and a link coupling part is fixed to an inner joint (refer to FIG. 2). Such an inward-folding and inner-joint type toggle link structure is advantageous in that it is suitable for a typical toggle link structure that is operated at high speed.

However, in the inward-folding and inner-joint type toggle link structure, the maximum stroke distance of the movable plate is 540 mm, and it is very difficult to further increase the stroke distance.

Meanwhile, to improve the conventional inward-folding and inner-joint type toggle link structure, an improved toggle link structure was proposed in U.S. Pat. No. 5,843,496 (hereinafter, referred to as conventional technique 1) in which a link coupling part is fixed to an outer joint.

Conventional technique 1 provides an inward-folding and outer-joint type toggle link structure, in which the area the links take in the injection molding machine is reduced and efficiency of mold clamping force generation is enhanced, compared to the inward-folding and inner-joint type toggle link structure.

The inward-folding and outer-joint type toggle link structure according to conventional technique 1 has advantages of improved efficiency in generating mold clamping force and being capable of more smoothly applying mold clamping force to a mold. However, it still has problems of difficulty in achieving a long stroke distance, that is, increasing the stroke distance, and difficulty in embodying high-speed operation.

Typically, in the case of the electric injection molding machines, toggle type injection molding machines are mainly used. In such a toggle type, links are connected to a perimeter of a movable plate rather than to a central portion thereof.

Therefore, during a mold closing operation, the links press the perimeter of the movable plate, thus markedly increasing the possibility of the mold being deformed compared to that of the direct pressure type injection molding machine. Furthermore, it is very difficult for the toggle type injection molding machines to realize a center pressing structure such that force is applied to central portion of the movable plate.

PRIOR ART DOCUMENT

Patent Document (Patent document 1) U.S. Pat. No. 5,843,496

SUMMARY OF THE INVENTION

Accordingly, the present invention has been made keeping in mind the above problems occurring in the prior art, and an object of the present invention is to provide a clamping apparatus for injection molding machines which can achieve purposes of high-speed mold opening or closing operation and an increase in a stroke distance and is capable of embodying a center pressing structure of the same level as that of the direct pressure type injection molding machine.

In order to accomplish the above object, the present invention provides a clamping apparatus for injection molding machines, including: a motor; a ball screw operated by the motor, the ball screw being oriented in a horizontal direction; a crosshead coupled to the ball screw so that, when the ball screw rotates, the crosshead moves forwards or backwards; a stationary plate and a rear plate connected to a tie bar; and a movable plate disposed between the stationary plate and the rear plate, the movable plate being moved forwards or backwards by links, wherein the links comprise: a first link having a first end forming a B-joint along with a first-side extension of the rear plate, the first link being oriented leftward and downwards based on the B-joint when the movable plate is moved backwards; a second link having a first end forming a G-joint along with a portion that protrudes outwards from a side surface of the first link, and a second end forming a D-joint along with the crosshead, the second link being oriented leftward and upwards based on the G-joint while connecting the G-joint to the D-joint; and a third link having a first end forming an A-joint along with a second end of the first link, and a second end forming a C-joint along with a second-side extension of the movable plate, the third link being oriented rightward and upwards based on the A-joint, wherein when the movable plate is moved forwards, the first link the first end of which forms the B-joint along with the first-side extension of the rear plate is horizontally oriented rightward based on the B-joint, the first end of the second link forms the G-joint along with the portion that protrudes outwards from the side surface of the first link, the second end of the second link forms the D-joint along with the crosshead, and the second link is oriented upwards based on the G-joint while connecting the G-joint to the D-joint, and the first end of the third link forms the A-joint along with the second end of the first link, the third link is oriented rightward based on the A-joint, and the second end of the third link forms the C-joint along with the second-side extension of the movable plate.

A clamping apparatus for injection molding machines according to the present invention has the following advantages.

(1) a toggle link structure is operated in such a way as to extend outwards, thus making it possible to increase a stroke distance.

(2) because the toggle link structure is operated in such a way as to extend outwards, mold opening or closing operation can be conducted at very high speed compared to that of the conventional five-joint toggle link structure.

(3) since a link that is connected to a movable plate is connected to a center or central portion of the movable plate, pressure of the same level as that of the direct pressing mold clamping apparatus can be applied to a mold, during a mold closing operation.

(4) the toggle link structure is operated in such a way as to extend outwards, and a crosshead and the movable plate correspond to each other in speed distribution. Therefore, shock is not generated even during high-speed operation, so that low-vibration and high-speed mold opening or closing operation can be realized.

(5) force required to accelerate or decelerate the movable plate is comparatively low, thus making low-vibration operation and high-cycle operation possible.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 3:
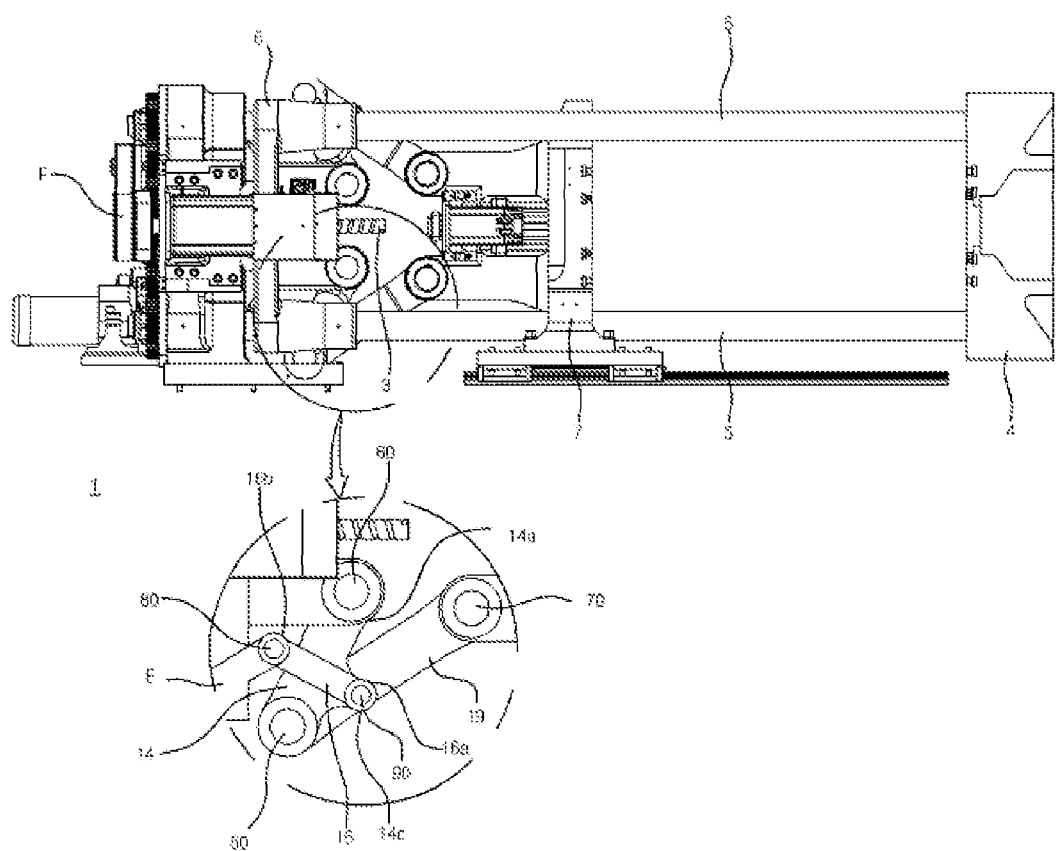
FIG. 3 is a side view illustrating a state of a clamping apparatus of an injection molding machine when a mold opens, according to the present invention.
Figure 4:
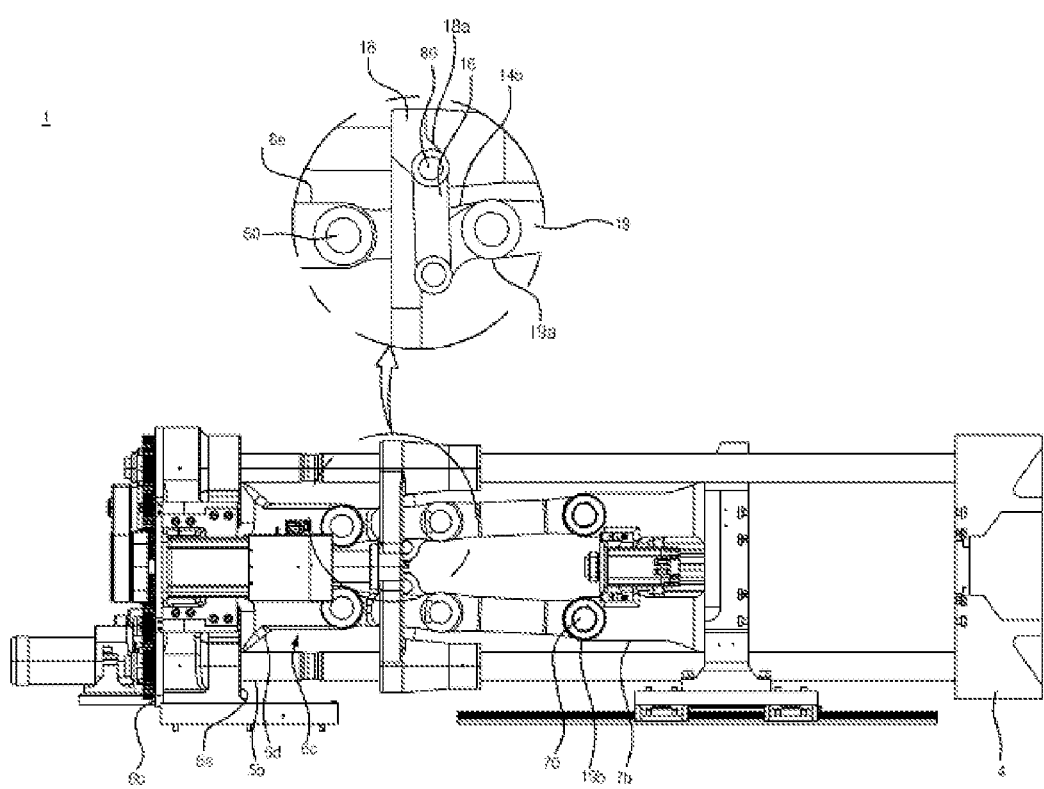
FIG. 4 is a side view illustrating a state of the clamping apparatus when the mold is closed, according to the present invention.
Figure 5:
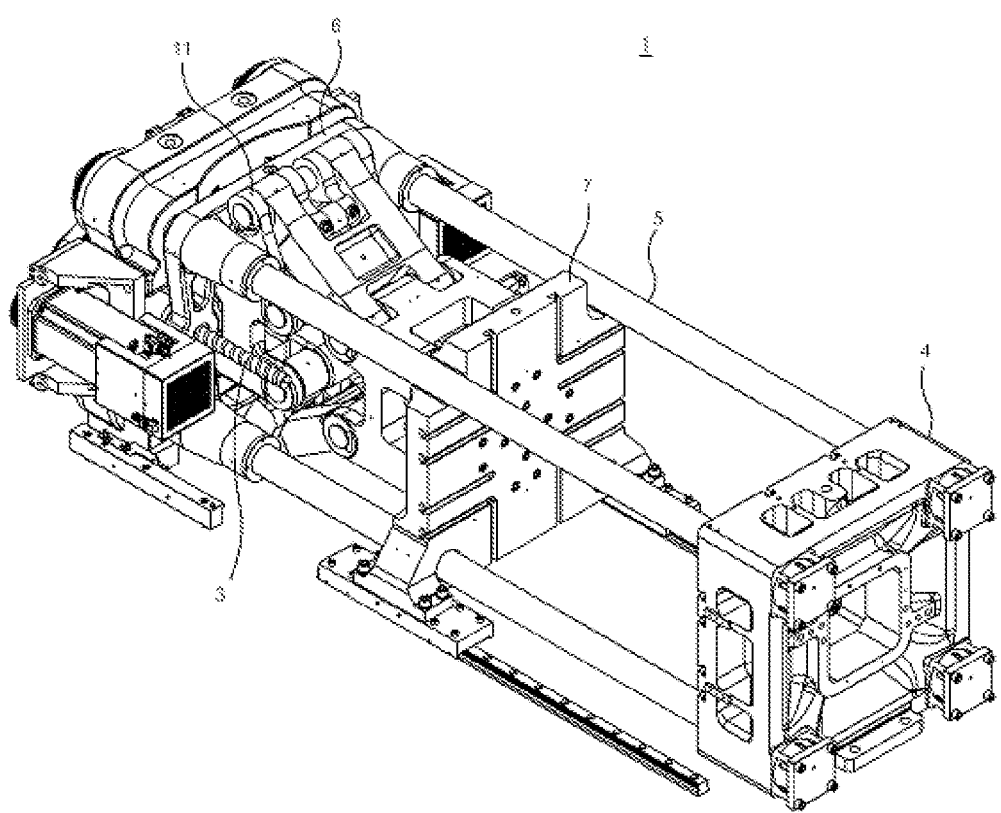
FIG. 5 is a perspective view illustrating a preferred embodiment of the clamping apparatus of the injection molding machine according to the present invention.
Figure 6:
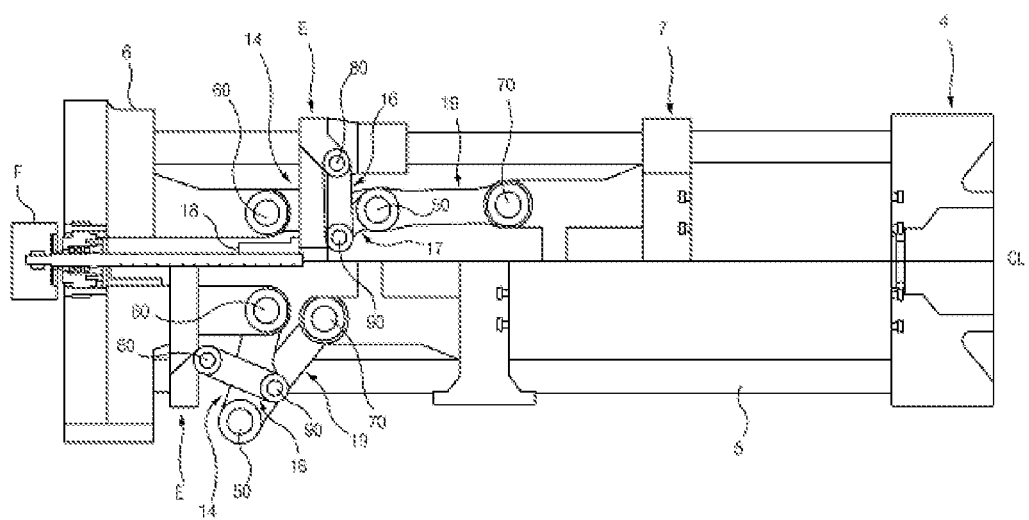
FIG. 6 is a side view of the clamping apparatus of the injection molding machine according to the present invention.

Hereinafter, a clamping apparatus for an injection molding machine according to a preferred embodiment of the present invention will be described in detail with reference to FIGS. 3 and 4.

The clamping apparatus of the injection molding machine according to the present invention includes a motor F, a ball screw 15 which is operated by the motor F and is horizontally disposed, a crosshead 18 which is coupled to the ball screw 15 and is moved forwards or backwards by rotation of the ball screw 15, a stationary plate 4 and a rear plate 6 which are coupled to tie bars 5, and a movable plate 7 which is disposed between the stationary plate 4 and the rear plate 6 and is moved forwards or backwards by links.

The motor F is disposed on a second side 6b of the rear plate 6. Preferably, a servo-motor is used as the motor F.

The motor F functions to operate the crosshead 18 for opening or closing a mold.

Furthermore, the motor F is connected to the crosshead 18 by the ball screw 3.

The crosshead 18 moves forwards or backwards along the ball screw 3 connected to the motor F.

Crosshead links E are provided on the crosshead 18. When viewed from a side view of the clamping apparatus 1 of the injection molding machine, the crosshead links E are oriented in the vertical direction.

D-joints 80 are provided on central portions of the respective crosshead links E.

In detail, each D-joint 80 is formed on an outer protrusion 18a provided on an outer surface of the corresponding crosshead link E. The outer protrusion 18a of each crosshead link E is preferably formed at a point corresponding to about ⅔ of the length of the crosshead link E based on the ball screw 3.

When viewed from the clamping apparatus 1 of the injection molding machine of the present invention, the outer protrusion 18a of the crosshead link E that is disposed below the ball screw 3 is inclined rightward and upwards.

When viewed from the clamping apparatus 1 of the injection molding machine of the present invention, the outer protrusion 18a of the crosshead link E that is disposed above the ball screw 3 is inclined rightward and downwards.

The tie bars are connected to the stationary plate 6.

In detail, first ends 5a of the tie bars are connected to a first side 4a of the stationary plate 6.

Second ends 5b of the tie bars are connected to a first side 6a of the rear plate 6.

As such, the stationary plate 4 and the rear plate 6 are disposed on the front and rear ends of the tie bars 5.

The movable plate 7 is disposed between the stationary plate 4 and the rear plate 6.

The rear plate 7 is moved by the links, which will be explained later herein, forward or rearwards under guidance of the tie bars 5.

Hereinafter, the links, which are operated such that, when the movable plate 7 is moved forwards or backwards by the operation of the motor F under guidance of the tie bars 5, mold clamping force is applied to a mold (not shown) that is mounted between the movable plate 7 and the stationary plate 4, will be explained in detail with reference to the drawings.

In the clamping apparatus 1 of the injection molding machine according to the present invention, when the movable plate 7 along with the crosshead 18 is moved backwards by the operation of the motor F, the mold opens, in other words, enters an open mold state.

In the open mold state, the position and shape of the links of the clamping apparatus 1 according to the present invention are as follows.

The links are configured to have a five-joint structure that depends on a connection structure of the crosshead link E.

Each first link 14 is connected to a first-side extension 6c of the rear plate.

When viewed from the side view of the clamping apparatus 1 of the injection molding machine according to the present invention, the shape of the first-side extension 6c of the rear plate will be explained below.

The first-side extension 6c of the rear plate includes a first part 6d and a second part 6e which is connected to the first part 6d.

The first part 6d of the first-side extension of the rear plate is thicker than the second part 6e of the first-side extension.

A B-joint 60, which will be explained later herein, is formed on the second part 6e of the first-side extension of the rear plate and is connected to the first link 14.

A first end 14a of the first link 14 forms the B-joint 60 between it and the first-side extension 6c of the rear plate 6, in detail, the second part 6e of the first-side extension 6c.

Thereby, the first link 14 is provided so as to be rotatable around the B-joint 60.

When viewed from the side view of the clamping apparatus 1 according to the present invention, the first link 14 that is disposed below the ball screw 3 extends leftward and downwards based on the B-joint 60 and is longer and thicker than a second link 16 which will be explained later herein.

Furthermore, when viewed from the side view of the clamping apparatus 1 according to the present invention, the first link 14 that is disposed above the ball screw 3 extends leftward and upwards based on the B-joint 60 and is also longer and thicker than the second link 16.

A second end 14b of the first link 14 is connected to a third link 19, which will be explained later herein, with an A-joint 50 formed between the second end 14b and the third link 19. The connection of the second end 14b of the first link 14 to the third link 19 will also be explained later.

A G-joint 90 is formed on a portion that protrudes outwards from a side surface of each first link 14, that is, on a protrusion 14c of the first link 14.

The position at which the G-joint 90 is disposed is a point corresponding to about ⅔ of the length of the first link 14 below the B-joint 60.

Each G-joint 90 is connected to the corresponding second link 16.

A first end 16a of each second link 16 forms the G-joint 90 between it and the portion that protrudes outwards from the side surface of the corresponding first link 14, that is, the protrusion 14c of the first link 14.

A second end 16b of each second link 16 forms the D-joint between it and the outer protrusion 18a of the corresponding crosshead link E.

When viewed from the side view of the clamping apparatus 1 of the present invention, the second link 16 that is disposed below the ball screw 3 extends leftward and upwards based on the G-joint 90.

Each second link 16 connects the corresponding G-joint 90 to the associated D-joint 80.

When viewed from the side view of the clamping apparatus 1 of the present invention, the second link 16 that is disposed above the ball screw 3 extends leftward and downwards based on the G-joint 90.

The outer protrusions 18a of the crosshead links E are configured such that, when viewed from the clamping apparatus 1 of the injection molding machine, one of the outer protrusions 18a that is disposed below the ball screw 3 is inclined rightward and upwards, and the other outer protrusion 18a that is disposed above the ball screw 3 is inclined rightward and downwards.

The second link 16 is shorter than the first link 14. When viewed from the sectional view of the clamping apparatus 1 of the present invention, the second link 16 is disposed between the first link 14 and the third link 19 which will be explained later herein.

In the clamping apparatus 1 according to this embodiment of the present invention, the two second links 16 are respectively disposed above and below the ball screw 3.

Each third link 19 is connected at a first end 19a thereof to the second end 14b of the corresponding first link, thus forming the A-joint 50.

That is, each first link 14 is connected to the corresponding third link 19, thus forming the A-joint 50. When the movable plate 7 that has been moved forwards by the motor F to conduct a mold closing operation is moved backwards again to conduct a mold opening operation, the first links 14 and the third links 19 which are connected to the corresponding A-joints 50 are moved outwards.

Consequentially, the first links 14 and the third links 19 move towards the corresponding tie bars 5.

Figure 1:
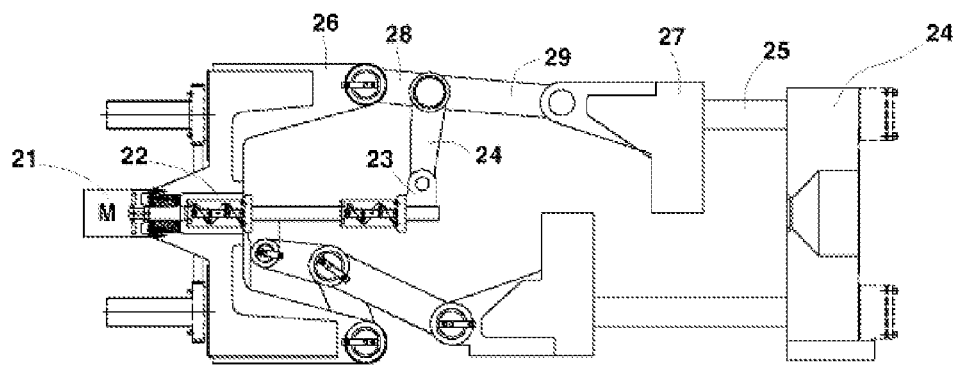
FIG. 1 is a side view showing an embodiment of a four-joint clamping apparatus according to a conventional technique.
Figure 2:
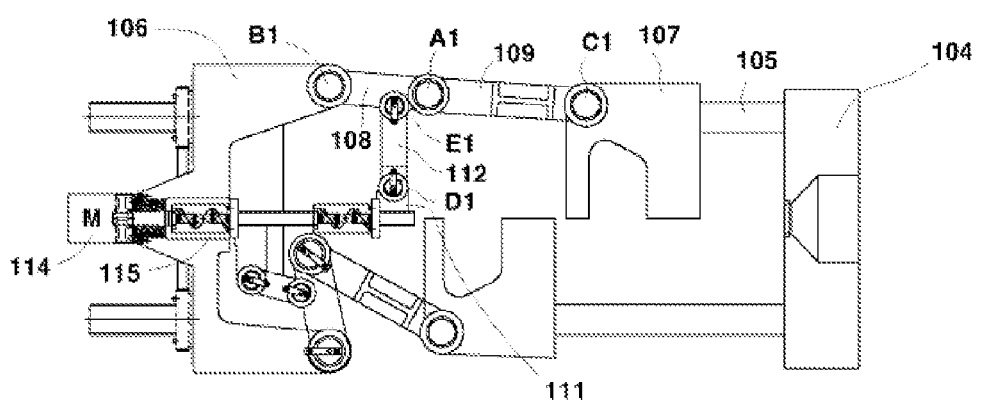
FIG. 2 is a side view showing an embodiment of a five-joint clamping apparatus according to a conventional technique.

As shown in FIG. 2, in the conventional five-joint clamping apparatus (refer to conventional technique 1), when the movable plate 107 is moved backwards, the links 108 and 109 move inwards, that is, towards the ball screw, based on the A1-joints.

Because the links 108 and 109 move inwards towards the ball screw, if the lengths of the links 108 and 109 are increased to increase a stroke distance, interference between the ball screw and the links 108 and 109 is inevitable. Therefore, there is a limitation in increasing the stroke distance.

However, in the clamping apparatus 1 of the injection molding machine according to the present invention, the first links 14 and the third links 19 which are connected to the A-joints 50 are moved outwards. Here, because open space is defined between the tie bars 5 of the injection molding machine, the first links 14 and the third links 19 enter the open space when moving outwards. Therefore, it becomes possible to increase the stroke distance (refer to FIG. 3).

Furthermore, because the first links 14 and the third links 19 which are connected to the A-joints 50 are moved outwards, force required to move the links is smaller than that of the conventional five-joint clamping apparatus (referring to conventional technique 1).

Therefore, force required to accelerate or decelerate the movable plate 7 is small, thus making it possible to conduct the mold opening or closing operation with low vibration. Since force required to conduct the mold opening or closing operation is reduced, high-cycle operation of the injection molding machine also becomes possible.

FIGS. 7A through 8B are speed-weight analysis graphs of the clamping apparatus 1 of the injection molding machine according to the present invention and speed-weight analysis graphs of conventional five-joint clamping apparatus.

Figure 7A:
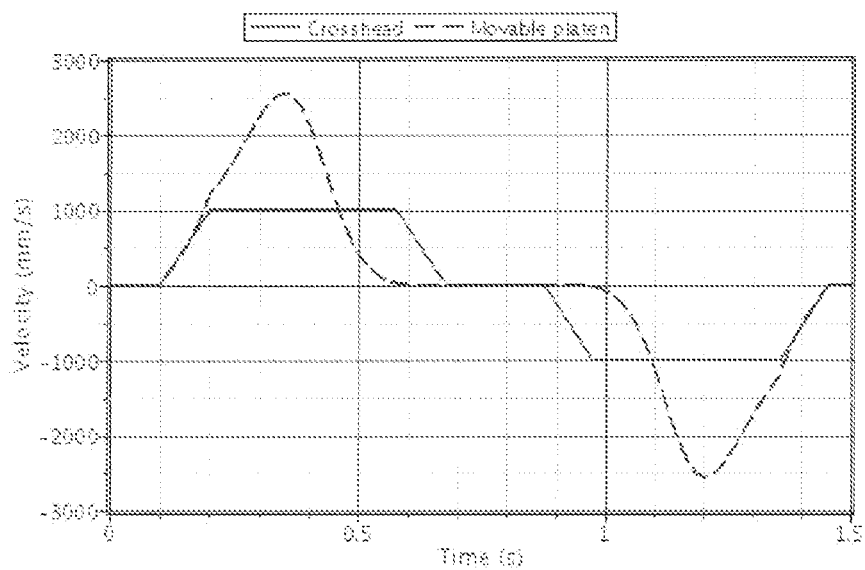
FIGS. 7A and 7B are speed-weight analysis graphs of the clamping apparatus of the injection molding machine according to the present invention.

As shown in FIG. 7A, in the clamping apparatus 1 of the injection molding machine according to the present invention, the crosshead 18 and the movable plate 7 correspond to each other in speed distribution. Therefore, low-vibration and high-speed mold opening or closing operation becomes possible.

Figure 7B:
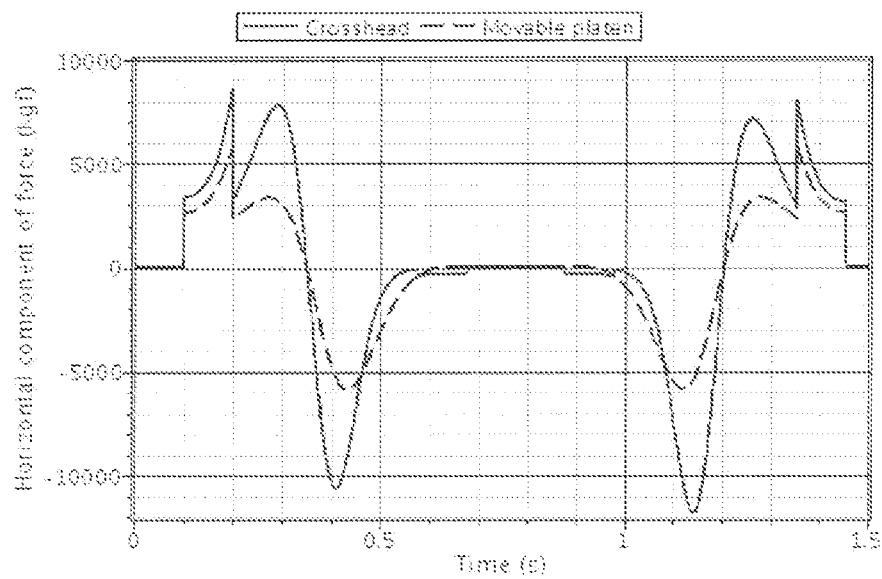
Figure 8A:
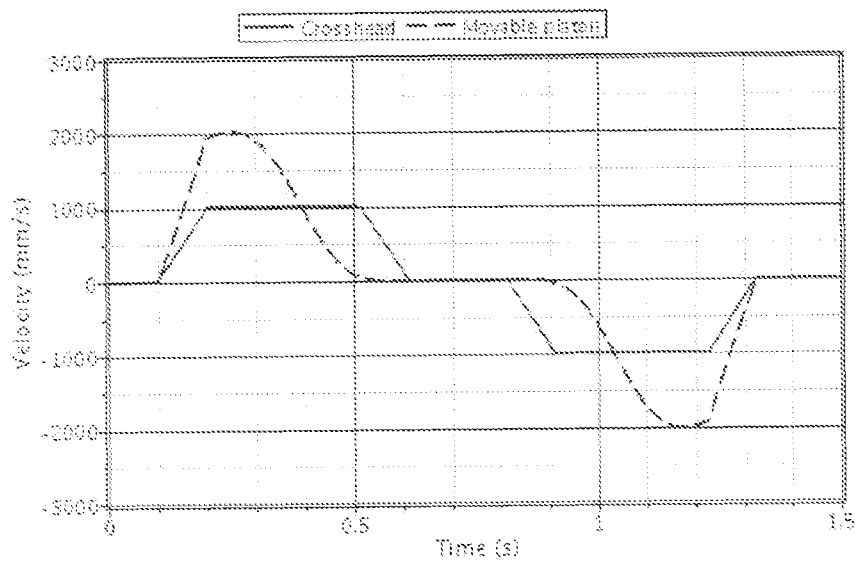
FIGS. 8A and 8B are speed-weight analysis graphs of the conventional five-joint clamping apparatus.
Figure 8B:
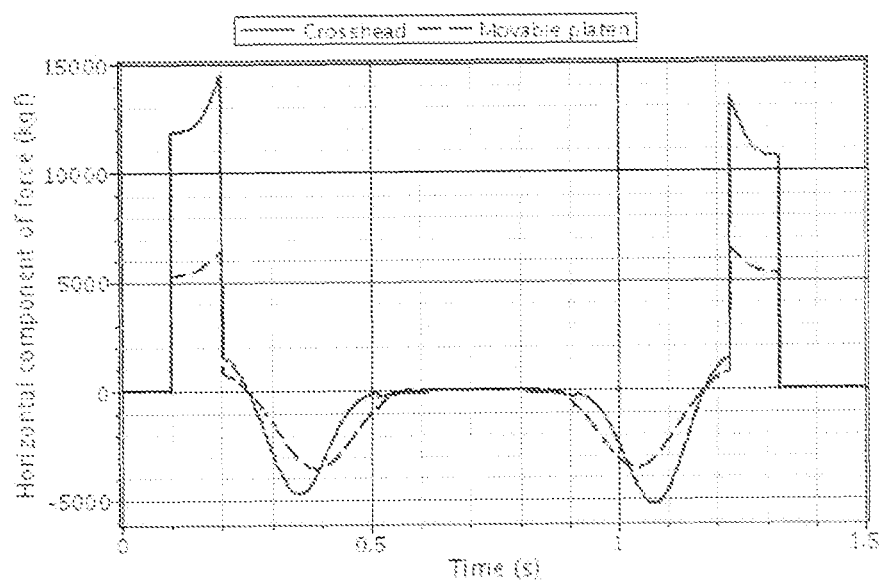

Furthermore, as shown in FIG. 7B, because force required when accelerating or decelerating the movable plate 7 to conduct the mold opening or closing operation is comparatively small, the present invention is suitable for realizing low-vibration and high-cycle operation of the injection molding machine.

According to speed analysis of the conventional five-joint clamping apparatus, there is a moment at which the crosshead and the movable plate do not correspond to each other in speed distribution. Hence, when the five-joint clamping apparatus is operated at high speed, shock is generated. Furthermore, because force required to accelerate or decelerate the movable plate is comparatively large, it is difficult to realize the low-vibration and high-cycle operation of the injection molding machine (refer to FIGS. 8A and 8B).

Meanwhile, when viewed from the side view of the clamping apparatus 1 of the injection molding machine according to the present invention, the third link 19 that is disposed below the ball screw 3 extends rightward and upwards based on the A-joint 50.

Furthermore, when viewed from the side view of the clamping apparatus 1 according to the present invention, the third link 19 that is disposed above the ball screw 3 extends rightward and downwards based on the A-joint 50.

A second end 19b of each third link 19 is connected to a second-side extension 7b of the movable plate with a C-joint 70 formed therebetween.

The joints 50, 60, 70, 80 and 90 function to make it possible to rotate the links 14, 16 and 19, the crosshead links 18 and the second-side extensions 7b of the movable plate which are connected to each other by the joints 50, 60, 70, 80 and 90.

Relative positions of the joints 50, 60, 70, 80 and 90 are as follows.

These relative positions will be explained based on the B-joint 60.

First, each C-joint 70 is at the right of the corresponding B-joint 60. The C-joint 70 that is disposed below the ball screw 3 is below the corresponding B-joint 60.

On the other hand, the C-joint 70 that is disposed above the ball screw 3 is above the corresponding B-joint 60.

Each G-joint 90 is disposed between the corresponding B-joint 60 and the associated C-joint 70 at a position closer to the B-joint 60 than the C-joint 70.

The G-joint 90 that is disposed below the ball screw 3 is positioned below the corresponding B-joint 60 and the associated C-joint 70 and above the corresponding A-joint 50 which will be explained later herein.

The G-joint 90 that is disposed above the ball screw 3 is positioned above the corresponding B-joint 60 and the associated C-joint 70 and below the corresponding A-joint 50.

Each A-joint 50 is disposed between the corresponding G-joint 90 and the associated D-joint 80 at the left of the corresponding B-joint 60. The A-joint 50 that is disposed below the ball screw 3 is positioned below the other joints 60, 70, 80 and 90, in other words, at the lowermost position among the joints.

The A-joint 50 that is disposed above the ball screw 3 is positioned above the other joints 60, 70, 80 and 90, in other words, at the uppermost position among the joints.

Each D-joint 80 is disposed at the left of the corresponding B-joint 60, that is, at the leftmost position among the joints, and is connected to the crosshead link E.

The D-joint 80 that is disposed below the ball screw 3 is positioned below the corresponding B-joint 60 and above the associated G-joint 90, in other words, between the G-joint 90 and the B-joint 60.

The D-joint 80 that is disposed above the ball screw 3 is positioned above the corresponding B-joint 60 and below the associated G-joint 90, in other words, between the G-joint 90 and the B-joint 60.

In the clamping apparatus 1 of the injection molding machine according to the present invention, when the movable plate 7 is moved forwards by the operation of the motor F, the mold is closed, that is, enters a mold closed state.

In the mold closed state, the positions and shapes of the links of the clamping apparatus 1 of the injection molding machine according to the present invention are as follows.

Each first-side extension 6c of the rear plate, in more detail, the second part 6e of each first-side extension 6c of the rear plate, along with the corresponding first link 14, forms the B-joint 60.

In the mold closed state, the first link 14 is oriented to the right towards the movable plate 7.

As stated above, each G-joint 90 is formed on the protrusion 14c of the corresponding first link 14.

Each second link 16 is connected to the corresponding G-joint 90.

That is, the first end 16a of the second link 16 is connected to the first link 14 by the G-joint 90.

The second end 16b of each second link 16 is connected to the outer protrusion 18a of the corresponding crosshead link by the associated D-joint 80.

In this mold closed state, when viewed from the side view of the clamping apparatus 1 of the present invention, the second link 16 that is disposed above the ball screw 3 extends upwards based on the corresponding G-joint 90.

On the other hand, when viewed from the side view of the clamping apparatus 1 of the present invention, in this mold closed state, the second link 16 that is disposed below the ball screw 3 extends downwards based on the corresponding G-joint 90.

The second link 16 is disposed between the B-joint 60 and the A-joint 50.

In the mold closed state, the positions and shapes of the third links 19 will be explained below.

The first end 19a of each third link 19 is connected to the second end 14b of the corresponding first link, thus forming the A-joint 50.

Furthermore, the second end 19b of each third link 19, along with the corresponding second-side extension 7b of the movable plate, forms the C-joint 70.

The second-side extensions 7b of the movable plate are disposed around a central portion of the movable plate 7.

As stated above, each second-side extension 7b of the movable plate is connected to the second end 19b of the corresponding third link by the associated C-joint 70.

In the mold closing operation, as the third links 19 move towards the movable plate 7, the second-side extensions 7b of the movable plate that are connected to the third links 19 push the movable plate 7 forwards.

Here, because the second-side extensions 7b of the movable plate are disposed around the central portion of the movable plate 7, mold closing force is applied to a central portion of the mold (not shown) that is disposed between the movable plate 7 and the stationary plate 4.

Therefore, in the clamping apparatus 1 of the present invention, the intensity of the mold closing force that is applied to the mold during the mold closing operation can become almost the same level as that of a direct pressure type mold clamping apparatus Each third link 19 is disposed at the right of the corresponding A-joint 50 and oriented towards the associated second-side extension 7b of the movable plate.

In other words, the third link 19 is positioned between the second link 16 and the second-side extension 7b of the movable plate.

In this embodiment of the clamping apparatus 1 of the injection molding machine according to the present invention, two pairs of first links 14 and two pairs of third links 19, that is, four firs links 14 and four third links 19, are provided. When viewed from the side view, a pair of first links 14 and a pair of third links 19 are disposed below the ball screw 3.

In addition, a pair of first links 14 and a pair of third links 19 are disposed above the ball screw 3.

As stated above, the joints 50, 60, 70, 80 and 90 function to make it possible to rotate the links 14, 16 and 19, the crosshead links 18 and the second-side extensions 7b of the movable plate which are connected to each other by the joints 50, 60, 70, 80 and 90.

The relative positions of the joints 50, 60, 70, 80 and 90, when in the mold closed state, are as follows.

Based on the B-joint 60, the relative positions of the other joints will be explained below.

Each A-joint 50 is disposed at the right of the corresponding B-joint 60 and at the left of the associated C-joint 70. In other words, the A-joint 60 is positioned between the B-joint 60 and the C-joint 70.

The A-joint 50 that is disposed above the ball screw 3 is positioned slightly above the B-joint 60 and between the corresponding D-joint 80 and the corresponding G-joint 90.

The A-joint 50 that is disposed below the ball screw 3 is positioned slightly below the B-joint 60 and also disposed between the corresponding D-joint 80 and the corresponding G-joint 90.

Each C-joint 70 is disposed at the right of the corresponding B-joint 60 and even the corresponding A-joint 50.

That is, the C-joint 70 is disposed at the rightmost position of the other joints.

The C-joint 70 that is disposed above the ball screw 3 is positioned slightly above not only the B-joint 60 but also the A-joint 50.

However, the C-joint 70 is disposed between the D-joint 80 and the G-joint 90.

The C-joint 70 that is disposed below the ball screw 3 is positioned slightly below not only the B-joint 60 but also the A-joint 50.

Furthermore, the C-joint 70 that is disposed below the ball screw 3 is positioned between the D-joint 80 and the G-joint 90 in the same manner as that of the C-joint 70 that is disposed above the ball screw 3.

Each D-joint 80 is disposed at the right of the corresponding B-joint 60 and at the left of the corresponding A-joint 50. In other words, the D-joint 80 is positioned between the B-joint 60 and the A-joint 50.

The D-joint 80 that is disposed above the ball screw 3 is positioned above the B-joint 60, the A-joint 50, the C-joint 70 and the G-joint 90.

The D-joint 80 that is disposed below the ball screw 3 is positioned below the B-joint 60, the A-joint 50, the C-joint 70 and the G-joint 90.

Each G-joint 90 is disposed at the right of the corresponding B-joint 60 and at the left of the corresponding A-joint 50. In other words, the G-joint 90 is positioned between the B-joint 60 and the A-joint 50.

The G-joint 90 that is disposed above the ball screw 3 is positioned below the B-joint 60, the A-joint 50, the C-joint 70 and the D-joint 90. Therefore, in the mold closed state, among these joints, the G-joint 90 that is disposed above the ball screw 3 is disposed at the lowermost position.

On the other hand, the G-joint 90 that is disposed below the ball screw 3 is positioned above the B-joint 60, the A-joint 50, the C-joint 70 and the D-joint 90. Thus, in the mold closed state, among these joints, the G-joint 90 that is disposed below the ball screw 3 is disposed at the uppermost position.

Based on the B-joint 60, because the G-joint 90 is disposed at a position spaced slightly farther from the B-joint 60 than is the D-joint 80, the G-joint 90 and the D-joint 80 are not placed on the same vertical line.

Figure 9:
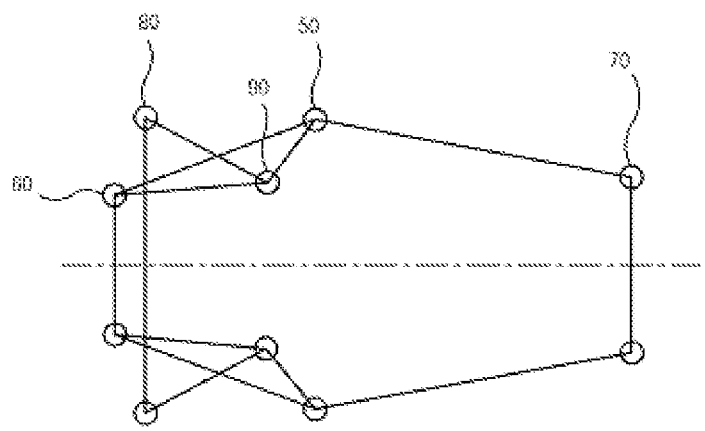
FIG. 9 is a schematic view illustrating mechanism of links and joints of the clamping apparatus of the injection molding machine according to the present invention.
Figure 10:
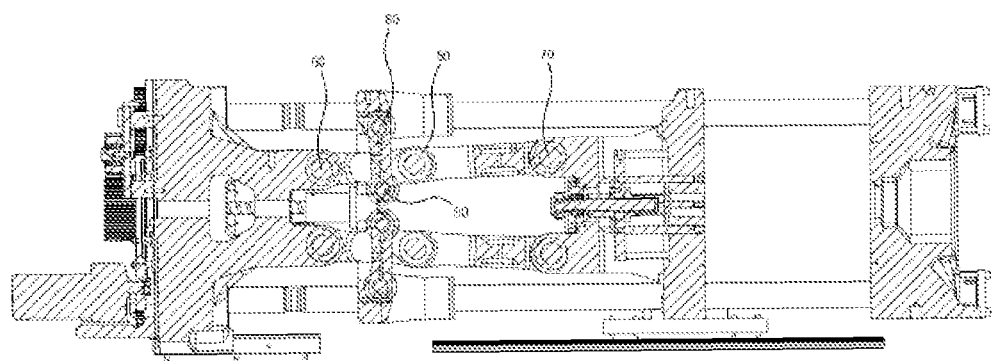
FIG. 10 is a side sectional view illustrating the state of the clamping apparatus when the mold is closed, according to the present invention.
Figure 11:
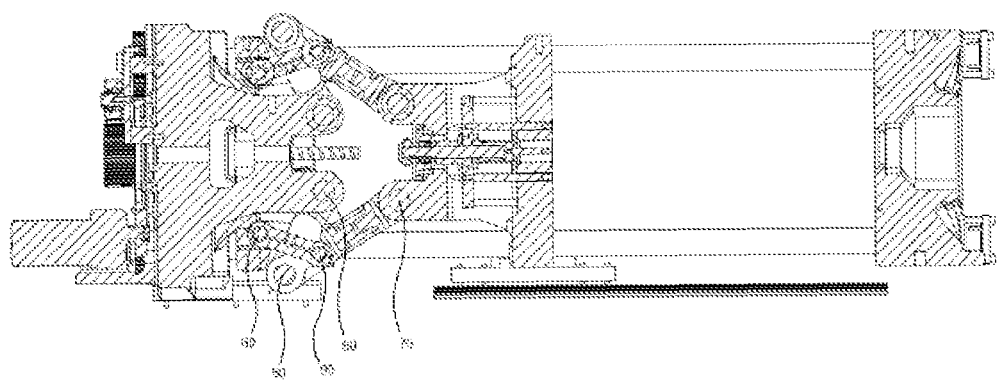
FIG. 11 is a side sectional view illustrating the state of the clamping apparatus when the mold opens, according to the present invention.

Unlike the conventional five-joint clamping apparatus, the clamping apparatus of the injection molding machine according to the present invention has a structure capable of center pressing, as shown in the schematic view (see, FIG. 9) illustrating mechanism of the links and the joints.

As described above, a clamping apparatus for an injection molding machine according to the present invention can realize a high-cycle and long-stroke distance structure, while keeping advantages of the conventional five-joint clamping apparatus, that is, the advantages of high mold opening or closing speed and control precision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mold clamping apparatus for an injection molding machine, comprising:
   a motor disposed at a rear plate;
   a ball screw operated by the motor, the ball screw being oriented in a horizontal direction;
   a crosshead coupled to the ball screw so that, when the ball screw rotates, the crosshead moves away from or toward the rear plate;
   a stationary plate and the rear plate connected to a tie bar; and
   a movable plate disposed between the stationary plate and the rear plate, the movable plate being arranged for movement away from or toward the rear plate by links comprising a first link, a second link and a third link,
   wherein, a first end of the first link forms a joint along with a first-side extension of the rear plate, a first end of the second link forms a joint along with a portion that protrudes outwards from a side surface of the first link, a second end of the second link forms a joint along with the crosshead, a first end of the third link forms a joint along with a second end of the first link, and a second end of the third link forms a joint along with a second-side extension of the movable plate,
   wherein when the movable plate is moved toward the rear plate, the first link extends from its first end in a direction away from the ball screw and the second end of the first link moves toward the rear plate, the second link extends from its second end in a direction away from the rear plate and away from the ball screw and the third link extends from its second end in a direction toward the rear plate and such that its first end is vertically more distant from the ball screw than its second end, and
   wherein when the movable plate is moved away from the rear plate, the first link becomes horizontally oriented and extends from its first end in a direction away from the rear plate and the second link becomes vertically oriented.

2. The mold clamping apparatus of claim 1 further comprising two sets of the first link, the second link and the third link wherein the two sets are arranged so that one set is vertically above the ball screw and the other set is vertically below the ball screw.

\* \* \* \* \*

UNITED STATES PATENT AND TRADEMARK OFFICE
CERTIFICATE OF CORRECTION

| | |
|---|---|
| PATENT NO. | : 8,814,559 B2 |
| APPLICATION NO. | : 13/940047 |
| DATED | : August 26, 2014 |
| INVENTOR(S) | : Yun Son Jon et al. |

It is certified that error appears in the above-identified patent and that said Letters Patent is hereby corrected as shown below:

In the Claims

In Col. 12, line 24
insert -- the movable plate, -- before "the first link"

Signed and Sealed this
Tenth Day of February, 2015

Michelle K. Lee
*Deputy Director of the United States Patent and Trademark Office*